United States Patent
Rines

(10) Patent No.: US 7,600,044 B2
(45) Date of Patent: Oct. 6, 2009

(54) SYSTEM AND METHOD FOR NETWORKED ENDPOINT REGISTRATION

(75) Inventor: Clark C. Rines, Mesa, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 445 days.

(21) Appl. No.: 11/452,735

(22) Filed: Jun. 13, 2006

(65) Prior Publication Data

US 2007/0288617 A1 Dec. 13, 2007

(51) Int. Cl.
*G06F 13/00* (2006.01)

(52) U.S. Cl. ............... 709/245; 709/238; 709/229

(58) Field of Classification Search ........... 709/245, 709/238, 229
See application file for complete search history.

(56) References Cited

U.S. PATENT DOCUMENTS

| | | | |
|---|---|---|---|
| 5,563,931 A | 10/1996 | Bishop | |
| 5,797,097 A | 8/1998 | Roach | |
| 5,859,897 A | 1/1999 | Furman | |
| 5,903,559 A | 5/1999 | Acharya | |
| 6,088,337 A | 7/2000 | Eastmond | |
| 6,519,242 B1 | 2/2003 | Emery | |
| 6,560,216 B1 | 5/2003 | McNiff | |
| 6,615,264 B1 | 9/2003 | Stoltz et al. | |
| 6,636,742 B1 | 10/2003 | Torkki | |
| 6,717,938 B1 | 4/2004 | D'Angelo | |
| 6,738,362 B1 | 5/2004 | Xu | |
| 6,751,459 B1 | 6/2004 | Lee | |
| 6,775,255 B1 | 8/2004 | Roy | |
| 6,958,992 B2 | 10/2005 | Lee et al. | |
| 7,310,541 B2 * | 12/2007 | Shostak | 455/575.6 |
| 2002/0131402 A1 * | 9/2002 | Lee et al. | 370/352 |
| 2003/0133450 A1 * | 7/2003 | Baum | 370/389 |
| 2005/0163060 A1 * | 7/2005 | Riley et al. | 370/254 |
| 2005/0185639 A1 | 8/2005 | Lee | |
| 2008/0159515 A1 * | 7/2008 | Rines | 379/221.08 |

FOREIGN PATENT DOCUMENTS

CA 2289455 7/1999

OTHER PUBLICATIONS

Entrust, Inc., Entrust TruePass Product Portfolio, technical white paper, Jul. 2003, pp. 1-24, Entrust.

* cited by examiner

*Primary Examiner*—Kenneth R Coulter
(74) *Attorney, Agent, or Firm*—Michelle Whittington, Esq

(57) ABSTRACT

A system and method for registering one or more networked endpoints devices includes indicating each user account to be associated with a registered endpoint. Each user account is assigned a unique PIN that will be used during registration of an endpoint. Once the endpoint is connected to the communication network, the system prompts the endpoint for a PIN. The PIN may be entered manually or electronically at the endpoint device. The system matches the PIN to its associated user account and sends the endpoint configuration files. The system retrieves the MAC address from the endpoint (which is generally stored within the endpoint device) and replaces the PIN with the MAC address. The endpoint is now registered on the network without the tedious task of manually entering long strings of addressing data.

16 Claims, 3 Drawing Sheets

SYSTEM AND METHOD FOR NETWORKED ENDPOINT REGISTRATION

FIELD OF INVENTION

The present invention relates generally to a system and method for networked endpoint registration.

BACKGROUND OF THE INVENTION

Endpoint devices are typically identified on a networked system by a unique set of digits assigned to the device, such as the Media Access Control (MAC) address. The digits or addressing data are usually stored in the local memory of the device and are often used during registration to include the device as part of the networked system.

This registration process may include identifying the endpoint device, verifying that the device is authorized to belong to the network, and establishing a data pathway to the device. Typically, the registration process involves manually keying in the device's addressing data as well as the IP address of the server to which the device is to connect. This largely manual process is tedious and extremely prone to mistakes. One wrong keyed-in digit will result in an error and require the system administrator to start over with registering the endpoint device. As the number of endpoint devices to be registered increases so does the length of the registration process and the margin for error.

An improved system and method for networked endpoint registration is desired that significantly reduces the level of labor-intensive digit key-in. It would also be desirable to register endpoint devices in a networked system in a rapid, simplified and efficient manner.

BRIEF DESCRIPTION OF THE DRAWINGS

These and other features, aspects and advantages of the present invention may be best understood by reference to the following description taken in conjunction with the accompanying drawings in which like numerals represent like elements.

DETAILED DESCRIPTION

Figure 1:
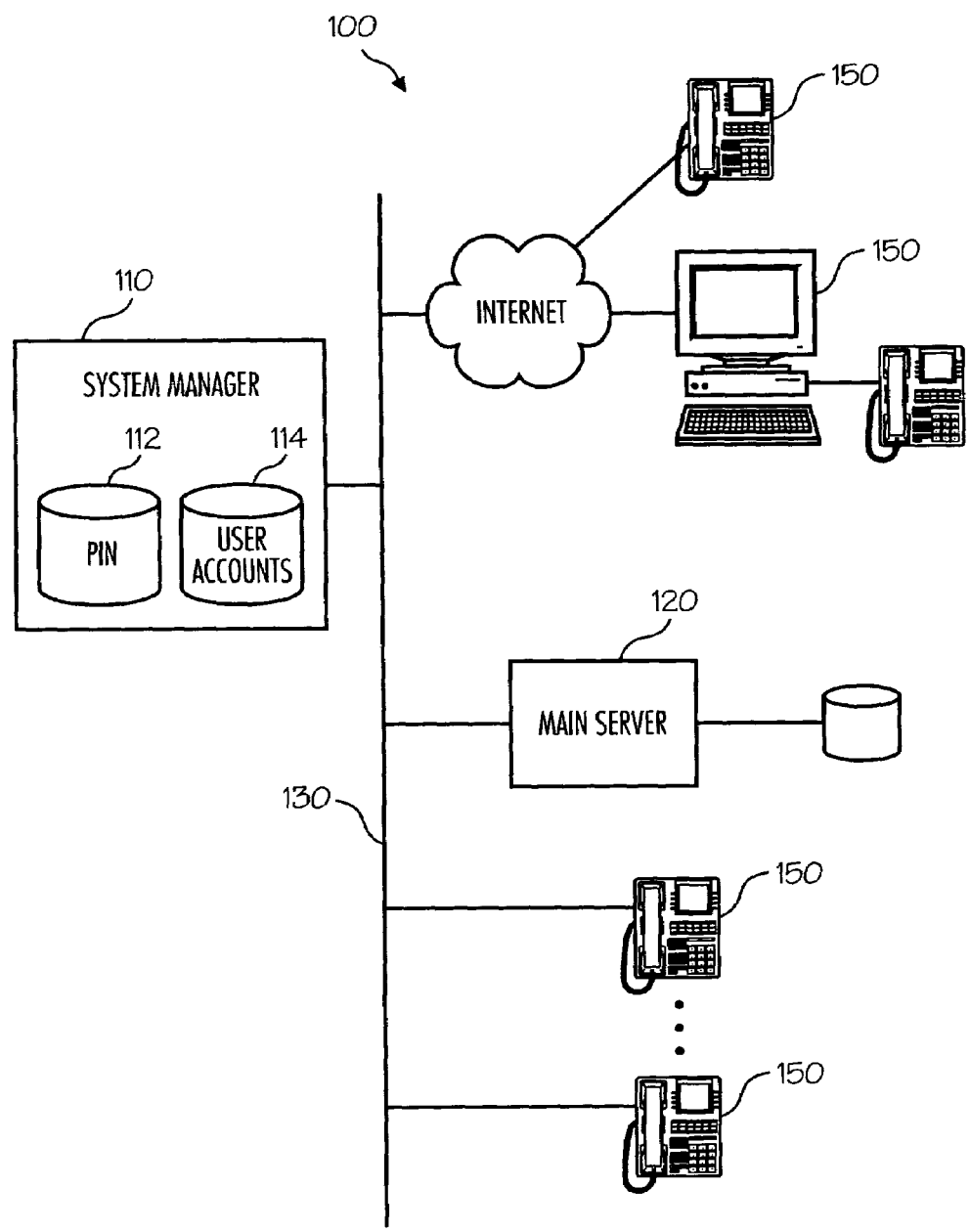
FIG. 1 illustrates an exemplary system architecture suitable for implementing a system and method for networked endpoint registration in accordance with the various embodiments.

FIG. 1 illustrates an exemplary system architecture 100 suitable for implementing a system and method for networked endpoint registration in accordance with the various embodiments. In general, a networked endpoint registration system 100 includes a system manager 110, a main server 120, a communication network 130, and one or more endpoints 150. Endpoints 150 may include any communication device capable of coupling to system network 130 including, but not limited to, telephones (stationary and portable), keysets, personal computers, computing devices, personal digital assistants, pagers, wireless remote clients, and messaging devices. In the particular embodiment depicted in FIG. 1, endpoints 150 include desktop keysets as well as keysets coupled to personal computing devices. Endpoints 150 may be local endpoints coupled to communication network 130 and/or remote endpoints coupled to network 130 via a remote network, the Internet or the like.

Used herein, "system manager" 110 may include software applications and the suitable computing device(s) used to run the applications. For example, a system administrator may initiate a software application to perform various functions in accordance with an endpoint registration system from a personal computing device, administration workstation or similarly equipped device. As will be discussed in more detail below, system manager 110 includes or is relationally linked to one or more databases having pertinent information stored thereon. Specifically, system manager 110 includes a storage of one or more system user accounts 114 and a storage for a PIN (personal identification number) associated with the user accounts. As will be detailed below, a PIN is assigned, e.g., by a random PIN generator, to a select group of system user accounts in accordance with the endpoint registration process discussed herein.

Main server 120 includes any suitable hardware, software, and/or storage combination used in a networked communication setting. Typically, the networked endpoints (or soon-to-be-networked endpoints) communicate with the main server and receive and report instructions, software applications, routing information, media session signaling, media data and configuration information.

Communication network 130 may be any suitable communication medium for routing data and information among a network of endpoints, e.g. LAN, Ethernet, wired and wireless solutions. Communication network 130 may also facilitate communications between local endpoints and remote endpoints, as well as system manager 110 and the remote endpoints via the Internet or the like.

Additional details regarding the various elements of system architecture 100 will be described in the text accompanying the following flowcharts. The flowcharts are provided to better understand the various steps of operation in registering one or more networked endpoints as described herein, as well as the exemplary elements, processes, applications and methods. It should be realized that the following description is not intended to be limiting but rather to provide a description of various embodiments and a best mode of operation. It should be appreciated that additional steps may occur that are not represented on the following flowcharts but are discussed in the conjoining text or elsewhere herein. Moreover, there may be operations, functions, routines, and the like that are not depicted on the flowcharts or elsewhere but are well understood in the industry as common actions for a communications system. Unless specifically stated, the order of the depicted and described operations are not limited to the conjoining description.

Figure 2:
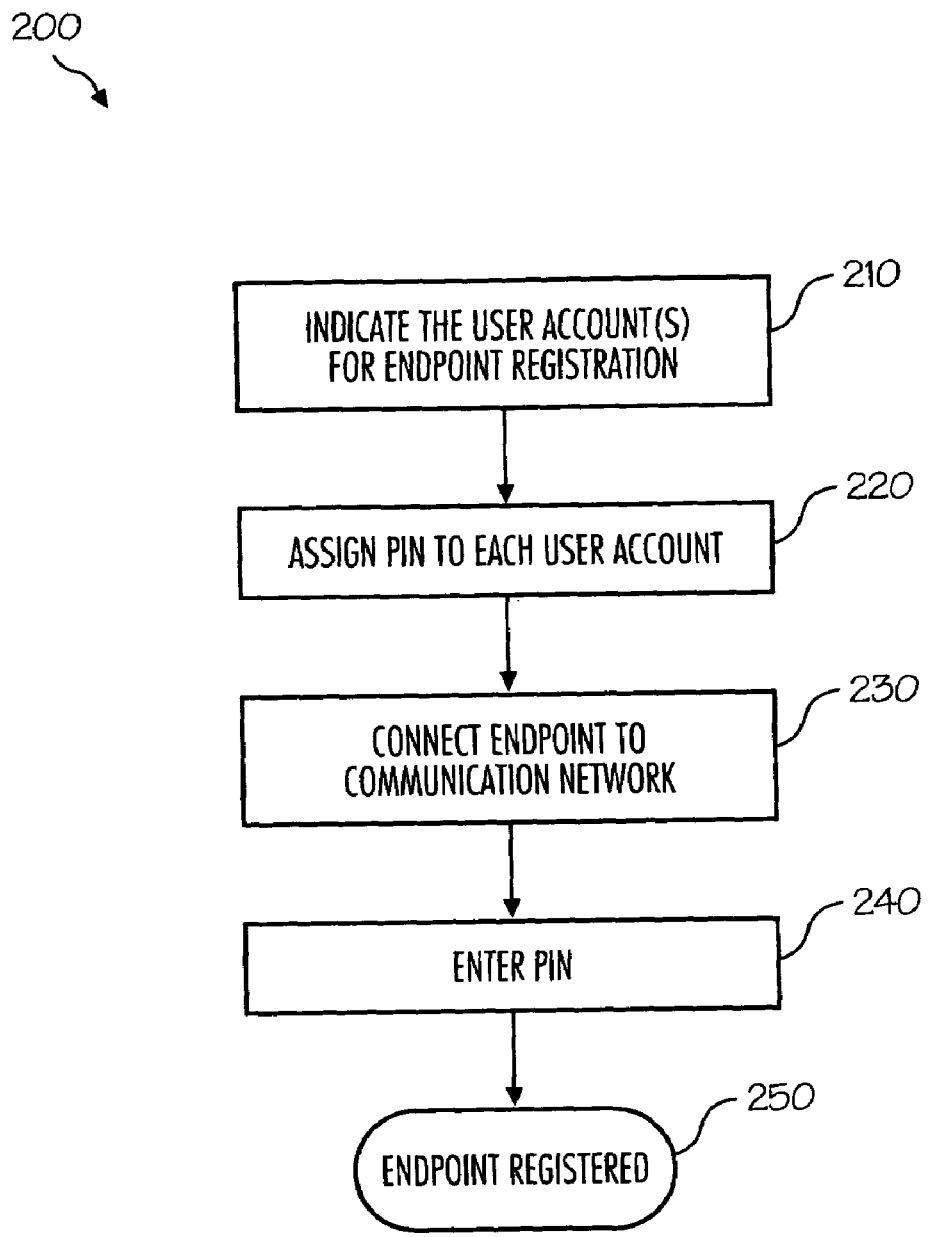
FIGS. 2 and 3 are flowcharts of exemplary operations in a networked endpoint registration system.

FIG. 2 is a flowchart 200 of exemplary operations in a networked endpoint registration system and, more particularly, the exemplary operations of a system administrator and/or user to register one or more endpoints within the system network. The system administrator is typically a human interface with the system, however it should be appreciated that many operations may be automated and not necessarily performed by a human. Initially, the system administrator indicates the user account(s) for which an endpoint is to be added and registered (step 210). For example, system manager 110 may include a list of user accounts 114 representative of the employees for the business, site, company, group or the like. Some of the employees may have multiple devices in their account, such as a desktop device, remote device, or multiple extensions. It may be that phantom extensions are used such that an actual employee name or user may not be associated with the device. It may also be the case that the system administrator creates a new alias or device for the user under the user account or creates the user altogether. At any rate, the system administrator determines one or more user names, alias', or sub-alias' for which endpoints are to be associated with and registered to on the system.

The system administrator then assigns a PIN to each user account for which an endpoint is to be registered (step 220). This may be performed by using a random number generator, manual key entry or any other appropriate means. Thus, the system administrator may select the PIN or it may be selected using automated methods. The PIN may include any unique combination of alpha-numeric digits, symbols or characters and is not limited to any specific string length. In one particular embodiment, the system manager performs a random PIN generation and assigns a PIN to each user name as selected by the system administrator.

At some point in the registration process, the endpoint is connected to the system communication network, such as network 130 (step 230). It should be realized that in the case of registration of remote endpoints, the network may not be a system-wide network but rather a home-based type network. As previously mentioned, the network should be capable of two-way communication between the endpoint and the system manager (e.g., system manager 110) and the main server (e.g., main server 120). Also, the network may include multiple connections, routings, firewalls and various other elements not mentioned herein but are common to communication networks.

Recall that each endpoint to be registered is associated with a unique PIN. The system administrator has a list of the user's account(s) for endpoint registration and their paired unique PINs. Upon initial installation, the PIN is then entered at the endpoint location or recognized by the system in any number of methods (step 240). In one embodiment, the system administrator sends each identified user an electronic message containing the PIN. For example, the system administrator may send an email to each user with instructions for the user to enter the enclosed PIN when indicated on the endpoint or associated computing device. Optionally, the endpoint may be associated with a computing device that reads the email content and PIN when opened and copies it to the endpoint automatically, thus the user does not have to enter the PIN manually. In yet another embodiment, the PIN may be included as a digital signature file that can be stored in a removable memory device and temporarily connected to the endpoint. In this embodiment the user is not required to enter the PIN, but rather the PIN is read directly from the portable memory. Of course, it may be that the system administrator retains the PIN and the user is not involved in the registration process at all. Upon system acceptance of the PIN (and various other system steps that will be discussed in the next flowchart), the endpoint is registered (step 250).

Figure 3:
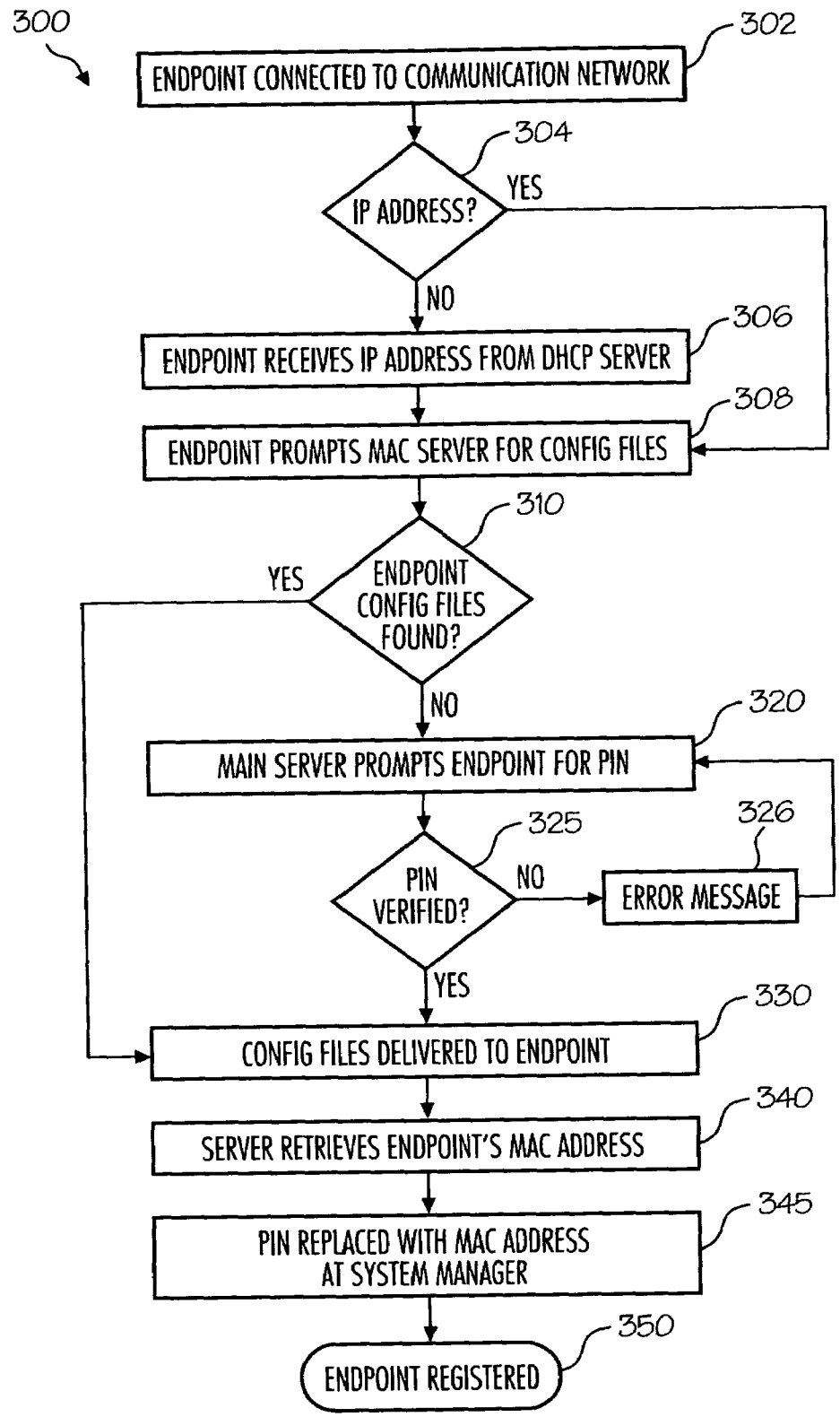

FIG. 3 is a flowchart 300 of exemplary operations in a networked endpoint registration system and, more particularly, the exemplary operations performed by the system, such as in a software application, to register one or more endpoints within the system network. Initially, the endpoint to be registered is connected to the system communication network (step 302). As previously explained in step 230, the communication network (e.g., network 130) should facilitate communication to and from the endpoint to the system manager and main server.

Once powered up, it is determined if the endpoint has received an IP address (step 304). If not, the endpoint may request and receive an IP address from the DHCP server (step 306). Alternatively, the IP address may be manually entered at the endpoint. Once the IP address of the server is recognized, the endpoint attempts to connect to the server (e.g., main server 120) to obtain the endpoint's configuration files (step 308). The server queries whether the endpoint is recognized, for example if the endpoint's MAC address matches a set of configuration files stored at the server (step 310). If the endpoint has been previously registered and the registration is still valid, then the endpoint MAC address should be found in the server and the configuration files are sent to the endpoint (step 330).

If the endpoint is not currently registered, then the server will not be able to recognize the endpoint as part of the networked system. In this case, the server sends a prompt to the endpoint for its unique PIN (step 320). The PIN may be entered at the endpoint, recognized through a digital signature or electronic message, or input in any number of various contemplated ways or as mentioned herein. The system may perform a verification to see if the PIN matches the endpoint location (step 325) or alternatively, the system may simply accept the PIN as a valid PIN number from the list of generated PINs. If the PIN number is not recognized by the system as a valid PIN or belonging to any of the user accounts, then the system may return an error message (step 326). If, however, the PIN is verified and accepted, then the configuration files for the endpoint are delivered (step 330) and the endpoint is ready for operation. The endpoint's MAC address is automatically retrieved (step 340) and will replace the PIN in the system manager (step 345). Thus, the user account is now correctly associated with the MAC address and the endpoint is registered within the system (step 350).

In one embodiment, the PIN may be deleted from the system manager after a successful registration to prevent multiple registration attempts using the same PIN.

In one embodiment, the PIN is time sensitive such that after a predetermined passage of time, the PIN is no longer valid. Thus, if the endpoint is not registered within the set period of time, a new PIN must be reassigned to the endpoint.

Presented herein are various systems, methods and techniques for networked endpoint registration, including the best mode. Having read this disclosure, one skilled in the industry may contemplate other similar techniques, modifications of structure, arrangements, proportions, elements, materials, and components for registering networked endpoint devices that fall within the scope of the present invention. These and other changes or modifications are intended to be included within the scope of the present invention, as expressed in the following claims.

The invention claimed is:

1. A communication system having hardware and software components for registering one or more networked endpoints comprising:
   an endpoint device having MAC address;
   a system manager comprising:
      a user account to be assigned to the endpoint device; and
      a PIN assigned to the user account;
   a communication network providing data routing between the endpoint device and the other system elements; and
   a server, coupled to the communication network, comprising a plurality of configuration files for the endpoint device, the server configured to request the endpoint device for the PIN and to transfer the configuration files to the endpoint device upon recognition of the PIN,
   whereby, the system manager receives the MAC address of the endpoint device and replaces the PIN assigned to the user account with the MAC address.

2. The system of claim 1, wherein the PIN is entered on the endpoint device after connection to the communication network.

3. The system of claim 1, further comprising an electronic communication delivered to the endpoint device, the PIN included in the electronic communication.

4. The system of claim 1, wherein the PIN is time-sensitive and must be replaced by the MAC address within a predetermined passage of time.

5. A method executing on hardware for registering one or more endpoint devices of the type having an associated MAC address, for each endpoint device the method comprising:
- indicating a user account to be assigned to the endpoint device;
- assigning a unique PIN to the user account;
- coupling the endpoint device to a communication network; and
- validating the unique PIN with the endpoint device which results in the user account automatically replacing the unique PIN with the associated MAC address.

6. The method of claim 5 further comprising, sending an electronic communication to a user representing the user account, the electronic communication comprising the unique PIN.

7. The method of claim 6, wherein the unique PIN is entered directly at the endpoint device using a key pad.

8. The method of claim 7, wherein the unique PIN is entered directly at the endpoint device through electronic transfer.

9. The method of claim 5 further comprising verifying the PIN is valid before replacing the unique PIN with the associated MAC address.

10. The method of claim 9, wherein verifying comprises reviewing a time-sensitive date of the unique PIN and rejecting the unique PIN if the date has passed.

11. A method executing on hardware for registering one or more endpoint devices of the type having a MAC address, for each endpoint device the method comprising:
- recognizing the endpoint device on a networked communication system;
- prompting the endpoint device for a unique PIN;
- receiving the unique PIN;
- matching the unique PIN to a stored user account, the stored user account being pre-assigned to the unique PIN;
- sending the endpoint device a set of configuration files;
- retrieving the MAC address from the endpoint device; and
- replacing the unique PIN with the MAC address for the stored user account.

12. The method of claim 11 further comprising, reading the unique PIN from a portable memory device coupled to the endpoint device.

13. The method of claim 11 further comprising, verifying the unique PIN is valid before sending the set of configuration files.

14. The method of claim 13, wherein verifying comprises reviewing a time-sensitive date of the unique PIN and rejecting the unique PIN if the date has passed.

15. The method of claim 11 further comprising, deleting the unique PIN upon replacement of the MAC address.

16. The method of claim 11, wherein the MAC address is stored on the endpoint device.

\* \* \* \* \*